(12) United States Patent
Al Majid

(10) Patent No.: US 11,803,403 B2
(45) Date of Patent: *Oct. 31, 2023

(54) CONTEXTUAL NAVIGATION MENU

(71) Applicant: Snap Inc., Santa Monica, CA (US)

(72) Inventor: Newar Husam Al Majid, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,698

(22) Filed: Jan. 13, 2023

(65) Prior Publication Data

US 2023/0153135 A1 May 18, 2023

Related U.S. Application Data

(63) Continuation of application No. 17/734,626, filed on May 2, 2022, now Pat. No. 11,625,255, which is a continuation of application No. 16/946,488, filed on Jun. 24, 2020, now Pat. No. 11,340,921.

(60) Provisional application No. 62/868,747, filed on Jun. 28, 2019.

(51) Int. Cl.
*G06F 9/451* (2018.01)
*G06F 3/04817* (2022.01)
*G06F 3/0482* (2013.01)

(52) U.S. Cl.
CPC ............ *G06F 9/453* (2018.02); *G06F 3/0482* (2013.01); *G06F 3/04817* (2013.01)

(58) Field of Classification Search
CPC ..... G06F 9/453; G06F 3/04817; G06F 3/0482
See application file for complete search history.

(56) References Cited

U.S. PATENT DOCUMENTS

| 10,754,545 | B2 * | 8/2020 | Diaz | B64D 11/0015 |
|---|---|---|---|---|
| 11,340,921 | B2 | 5/2022 | Al Majid | |
| 2011/0296346 | A1 | 12/2011 | Chen et al. | |
| 2014/0344749 | A1 | 11/2014 | Choi et al. | |
| 2015/0067609 | A1 * | 3/2015 | Moon | G06F 3/0482 715/835 |
| 2015/0277702 | A1 | 10/2015 | Hardwick et al. | |
| 2016/0283055 | A1 | 9/2016 | Haghighat et al. | |
| 2017/0017458 | A1 | 1/2017 | Matsunaga | |
| 2018/0330732 | A1 | 11/2018 | Dasgupta | |
| 2019/0289367 | A1 * | 9/2019 | Siddiq | H04N 21/485 |
| 2020/0007939 | A1 * | 1/2020 | Tang | H04N 21/47202 |
| 2020/0409729 | A1 | 12/2020 | Al Majid | |

(Continued)

FOREIGN PATENT DOCUMENTS

| CN | 114008577 A | 2/2022 |
|---|---|---|
| KR | 20180058476 A | 6/2018 |
| WO | WO-2020264184 A1 | 12/2020 |

OTHER PUBLICATIONS

"U.S. Appl. No. 16/946,488, Corrected Notice of Allowability dated Feb. 7, 2022", 2 pgs.

(Continued)

*Primary Examiner* — Seth A Silverman
(74) *Attorney, Agent, or Firm* — Schwegman Lundberg & Woessner, P.A.

(57) ABSTRACT

Systems and methods to generate and cause display of a contextual navigation menu within a GUI, wherein the contextual navigation menu presents contextually relevant interface elements.

20 Claims, 7 Drawing Sheets

(56) References Cited

U.S. PATENT DOCUMENTS

2022/0342683 A1 10/2022 Al Majid

OTHER PUBLICATIONS

"U.S. Appl. No. 16/946,488, Final Office Action dated Apr. 5, 2021", 25 pgs.
"U.S. Appl. No. 16/946,488, Final Office Action dated Sep. 1, 2021", 27 pgs.
"U.S. Appl. No. 16/946,488, Non Final Office Action dated Jun. 28, 2021", 22 pgs.
"U.S. Appl. No. 16/946,488, Non Final Office Action dated Dec. 28, 2020", 21 pgs.
"U.S. Appl. No. 16/946,488, Notice of Allowance dated Jan. 25, 2022", 8 pgs.
"U.S. Appl. No. 16/946,488, Response filed Feb. 8, 2021 to Non Final Office Action dated Dec. 28, 2020", 11 pgs.
"U.S. Appl. No. 16/946,488, Response filed Jun. 3, 2021 to Final Office Action dated Apr. 5, 2021", 10 pgs.
"U.S. Appl. No. 16/946,488, Response filed Jul. 26, 2021 to Non Final Office Action dated Jun. 28, 2021", 10 pgs.
"U.S. Appl. No. 16/946,488, Response filed Oct. 27, 2021 to Final Office Action dated Sep. 1, 2021", 10 pgs.
"U.S. Appl. No. 17/734,626, Notice of Allowance dated Dec. 7, 2022", 9 pgs.
"U.S. Appl. No. 17/734,626, Preliminary Amendment filed Jul. 12, 2022", 6 pgs.
"European Application Serial No. 20832227.1, Extended European Search Report dated Jul. 14, 2022", 9 pgs.
"International Application Serial No. PCT/US2020/039654, International Preliminary Report on Patentability dated Jan. 6, 2022", 6 pgs.
"International Application Serial No. PCT/US2020/039654, International Search Report dated Oct. 15, 2020", 3 pgs.
"international Application Serial No. PCT/US2020/039654, Written Opinion dated Oct. 15, 2020", 4 pgs.

\* cited by examiner

400

```
┌─────────────────────────────────────────────────────────┐
│ CAUSING DISPLAY MEDIA CONTENT WITHIN A GRAPHICAL USER   │
│ INTERFACE (GUI), THE GUI COMPRISING A MENU ELEMENT TO   │
│         DISPLAY A SET OF NAVIGATION ICONS               │
│                         402                             │
└─────────────────────────────────────────────────────────┘
                            │
                            ▼
┌─────────────────────────────────────────────────────────┐
│ ACCESSING CONTEXTUAL DATA IN RESPONSE TO THE CAUSING    │
│ DISPLAY OF THE MEDIA CONTENT WITHIN THE GUI, THE        │
│ CONTEXTUAL DATA INCLUDING ATTRIBUTES OF THE MEDIA       │
│ CONTENT                                                 │
│                         404                             │
└─────────────────────────────────────────────────────────┘
                            │
                            ▼
┌─────────────────────────────────────────────────────────┐
│  GENERATING A CONTEXTUAL ICON BASED ON THE CONTEXTUAL   │
│                          DATA                           │
│                         406                             │
└─────────────────────────────────────────────────────────┘
                            │
                            ▼
┌─────────────────────────────────────────────────────────┐
│ CAUSING DISPLAY OF A PRESENTATION OF THE CONTEXTUAL     │
│              ICON WITHIN THE MENU ELEMENT               │
│                         408                             │
└─────────────────────────────────────────────────────────┘
```

*FIG. 4*

CONTEXTUAL NAVIGATION MENU

CLAIM OF PRIORITY

This application is a continuation of U.S. application Ser. No. 17/734,626, filed May 2, 20221, which application is a continuation of U.S. application Ser. No. 16/946,488, filed Jun. 24, 2020, now issued as U.S. Pat. No. 11,340,921, which application claims the benefit of priority to U.S. Provisional Application Ser. No. 62/868,747, filed on Jun. 28, 2019, which is incorporated herein by reference in its entirety.

TECHNICAL FIELD

Embodiments of the present disclosure relate generally to graphical user interfaces, and more specifically to interface elements presented within graphical user interfaces.

BACKGROUND

A graphical user interface (GUI) is a form of user interface that allows users to interact with electronic devices through graphical icons and visual indicators instead of purely text-based user interfaces, typed command labels, or text navigation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for generating and causing display of a contextual navigation menu, according to certain example embodiments.

DETAILED DESCRIPTION

Figure 1:
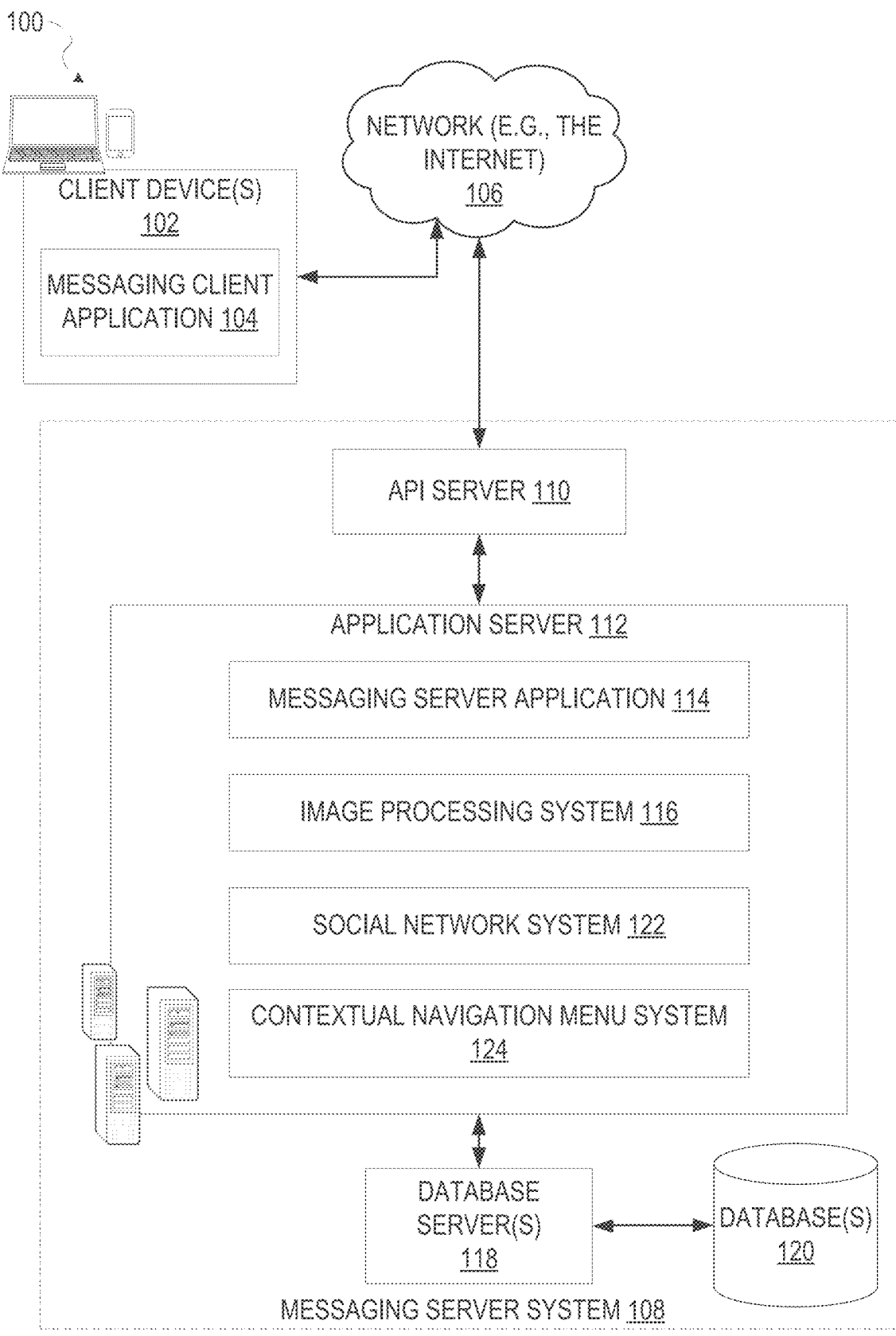
FIG. 1 is a block diagram showing an example messaging system for exchanging data (e.g., messages and associated content) over a network in accordance with some embodiments, wherein the messaging system includes a contextual navigation menu system.

As discussed above, GUIs are a form of user interface that allows users to interact with electronic devices through graphical icons and visual indicators instead of purely text-based user interfaces, typed command labels, or text navigation. Example embodiments described herein relate to systems and methods to generate and cause display of a contextual navigation menu within a GUI, wherein the contextual navigation menu presents contextually relevant interface elements.

Contextual relevance may for example be based on contextual data accessed at a client device. Contextual data may for example include temporal data, location data, device attributes, media attributes, a state of a user session, as well as user profile data. Accordingly, a contextual navigation menu system may perform operations that include: causing display of media content within a GUI, wherein the menu element is configured to display a set of navigation icons, and wherein each icon among the set of navigation icons is associated with a corresponding set of user actions; accessing contextual data in response to the causing display of the media content, wherein the contextual data includes attributes of the media content; generating a contextual icon based on the contextual data; and causing display of a presentation of the contextual icon at a position within the menu element.

As an illustrative example from a user perspective, a client device may execute one or more applications to display GUI to present media content. A user of the client device may present media content within the GUI, wherein the media content comprises a set of media attributes. The GUI also includes a display of a contextual navigation menu at a position within the GUI, wherein the contextual navigation menu includes a display of a plurality of graphical icons. The graphical icons may correspond to various user-session states, including but not limited to a messaging state, a camera/media generation state, and a discovery/media consumption state.

Accordingly, each of the user-session states may be associated with a corresponding set of user actions. For example, the messaging state may be associated with a set of user actions relevant to generating a user message (i.e., text entry field, media entry field, contact list), the camera/media generation state may be associated with a set of user actions relevant to generating content (i.e., media selection menu, filter selection options), and the discovery/media consumption state may be associated with a set of user actions relevant to searching for and identifying relevant content to consumer and view (i.e., a search menu).

Accordingly, responsive to causing display of the media content within the GUI at the client device, a contextual navigation menu system accesses contextual data, wherein the contextual data includes attributes of the media content, as well as user-session state-based data. For example, the contextual data may include: location data; temporal data; user profile data; and communication session data. The contextual navigation menu system may then generate and cause display of a contextual icon at a position within the menu element of the GUI, wherein the contextual icon comprises properties that may be based on the accessed contextual data.

For example, in some embodiments, the contextual icon may include elements extracted from media content presented within the GUI, or properties of the media content presented within the GUI. For example, the media content may comprise a display of one or more user identifiers at positions within the media content (i.e., "mentions"). Responsive to detecting the display of the one or more user identifiers, the system may generate a contextual icon configured to receive an input and display a secondary menu element to display the one or more user identifiers from the media content.

In some embodiments, the media content may include a display of a link to a website (i.e., a URL). Responsive to detecting the display of the link to the website, the disclosed system generates a contextual icon that includes a display of the link to the website at a position within the menu element presented in the GUI.

In some embodiments, the media content may include audio or video data. Responsive to detecting the audio or video data, the system may generate a contextual icon that includes a display of one or more media control symbols (i.e., play, pause, reverse, stop, fast forward, rewind, repeat).

In some embodiments, the media content may include a query, wherein the query comprises a request for a response, and wherein the response may include a binary response (i.e., true or false, yes or no), a selection of an option from a radio selection, or a text input. Responsive to detecting the query, the system may generate a contextual icon that includes a display of one or more options to respond to the query within a graphical icon presented in the menu element of the GUI.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a contextual navigation menu system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
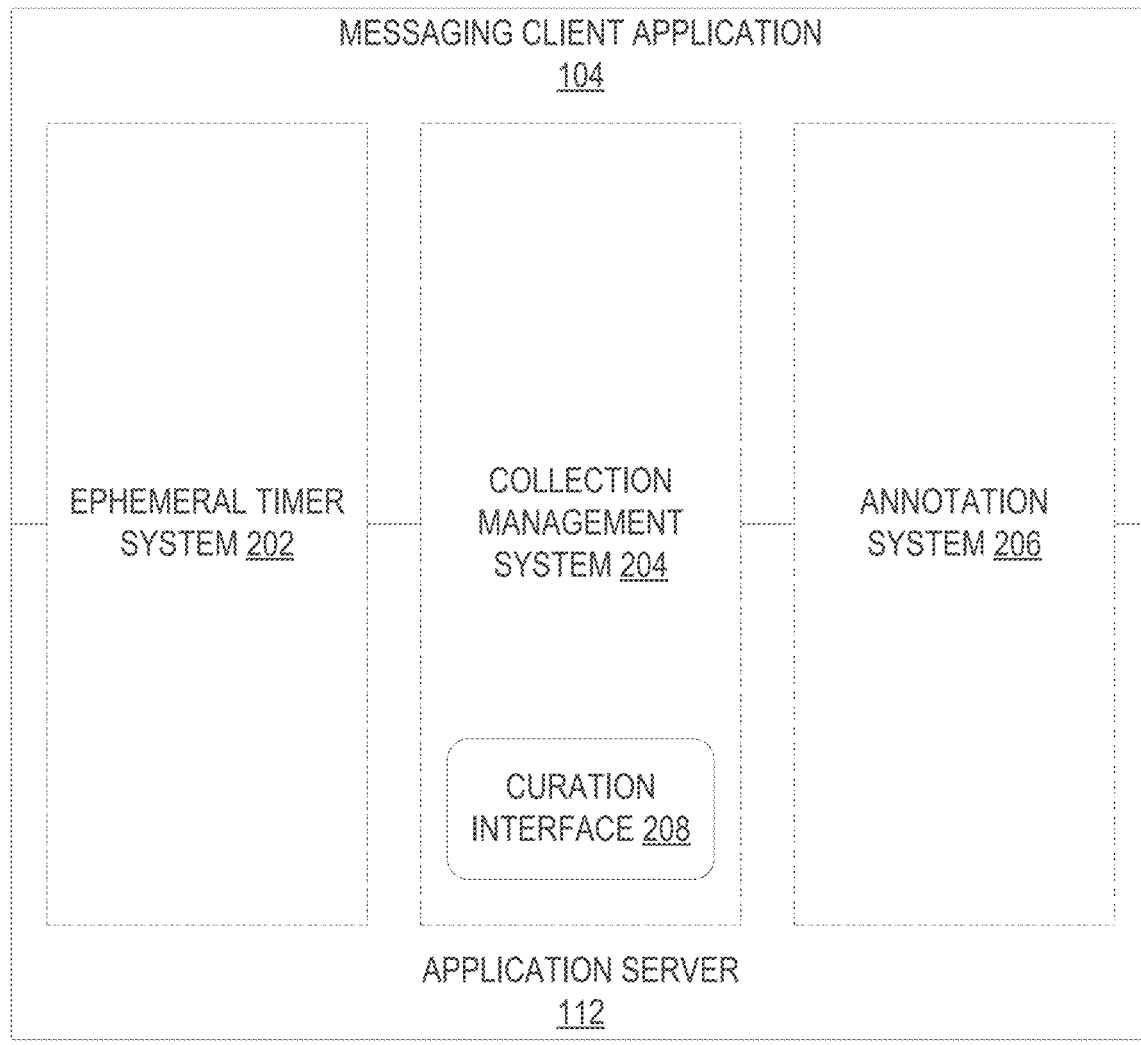
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time.

Figure 3:
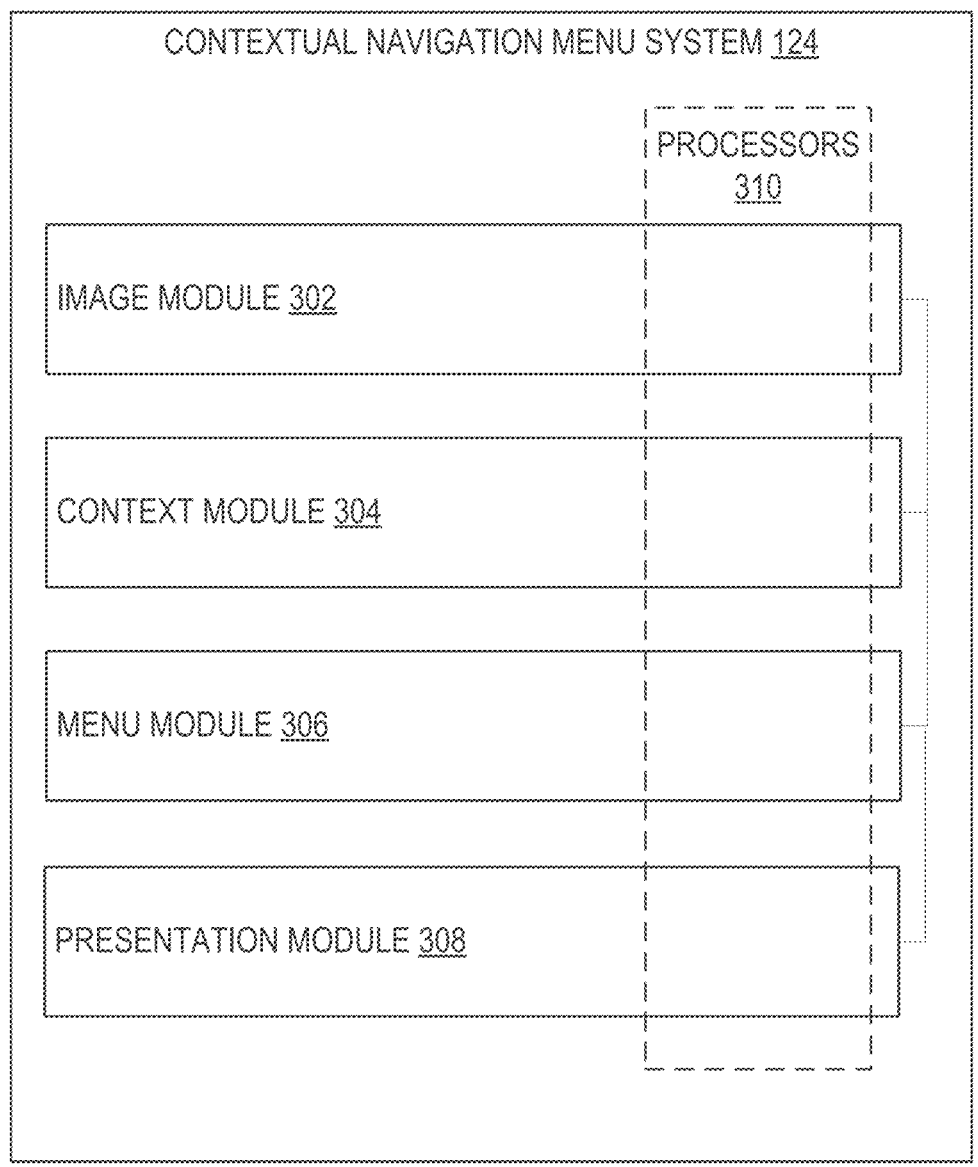
FIG. 3 is a block diagram illustrating various modules of a contextual navigation menu system, according to certain example embodiments.

FIG. 3 is a block diagram illustrating components of the contextual navigation menu system 124 that configure the contextual navigation menu system 124 to generate and cause display of a contextual navigation menu, according to certain example embodiments.

The contextual navigation menu system 124 is shown as including an image module 302, a context module 304, a menu module 306, and a presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the contextual navigation menu system 124 may physically include an arrangement of one or more of the processors 310 (e.g., a subset of or among the one or more processors of the machine) configured to perform the operations described herein for that module. As another example, any module of the contextual navigation menu system 124 may include software, hardware, or both, that configure an arrangement of one or more processors 310 (e.g., among the one or more processors of the machine) to perform the operations described herein for that module. Accordingly, different modules of the contextual navigation menu system 124 may include and configure different arrangements of such processors 310 or a single arrangement of such processors 310 at different points in time. Moreover, any two or more modules of the contextual navigation menu system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for generating and causing display of a contextual navigation menu, according to certain example embodiments. Operations of the method 400 may be performed by the modules described above with respect to FIG. 3. As shown in FIG. 4, the method 400 includes one or more operations 402, 404, 406, and 408.

At operation 402, the image module 302 causes display of media content within a GUI of a client device 102, wherein the GUI comprises a menu element to display a set of navigation icons (i.e., graphical icons), wherein each navigation icon among the set of navigation icons corresponds with one or more user actions. For example, in some embodiments, the menu element may comprise a set of "static" icons at positions within the menu element, wherein the static icons do not change based on context. The menu element may further comprise a region in which to display a contextual icon, wherein the contextual icon may vary based on a number of contextual factors discussed herein.

At operation 404, the context module 304 accesses contextual data responsive to the display of the media content within the GUI, wherein the contextual data includes attributes of the media content, as well as user-session state data that indicates a session state of the user in a browsing session of an application.

In some embodiments, the attributes of the media content may include one or more of: elements presented within the media content; a media type of the media content (i.e., image, video, audio, web URL); a source of the media content a sender); graphical properties of the media content; as well as audio properties of the media content.

At operation 406, the menu module 306 generates a contextual icon based on the contextual data. For example, in some embodiments, the menu module 306 may parse one or more elements from the media content displayed within the GUI, and generate the contextual icon based on the one or more elements. For example, as seen in the interface diagram 500 of FIG. 5, a GUI may display media content 504, wherein the media content 504 includes a display of a user identifier 518 (i.e., a "mention"). Responsive to detecting the user identifier 518 within the media content 504, the menu module 306 may generate the contextual icon 512, wherein the contextual icon 512 includes a display of the user identifier, and wherein an input that selects the contextual icon 512 may cause display of a presentation of all user identifiers displayed within the media content 504.

Similarly, the media content 508 may comprise a hyperlink to a webpage (i.e., YOUTUBE.COM). Responsive to detecting the hyperlink to the webpage, the menu module 306 may generate the contextual icon 516, wherein the contextual icon 516 comprises a display of a URL to the web-page, and wherein an input that selects the contextual icon 516 may direct a browser of the client device 102 to the corresponding webpage.

At operation 408, the presentation module 308 causes display of a presentation of the contextual icon at a position among one or more interface elements within the menu element. Accordingly, the contextual navigation menu system 124 may present a changing, and context based menu element, wherein at least some of the icons presented in the menu element may be based on corresponding contextual factors.

Figure 5:
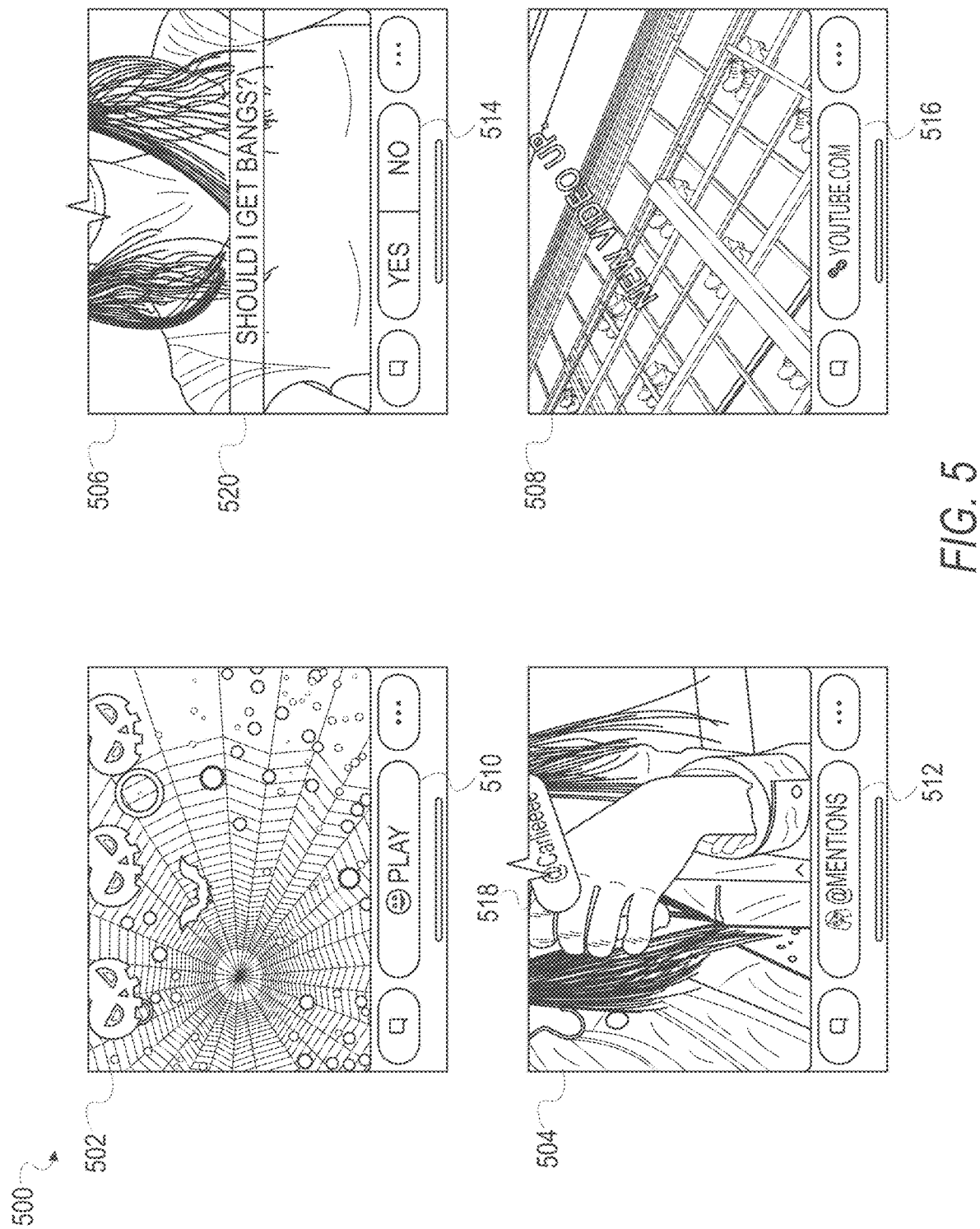
FIG. 5 is an interface flow diagram illustrating various states of a contextual navigation menu, according to certain example embodiments.

FIG. 5 is an interface diagram 500 illustrating contextual navigation menus which may be presented by a contextual navigation menu system 124, according to certain example embodiments. As discussed in the method 400, the contextual navigation menu system 124 may present a contextual icon within a menu element, wherein the contextual icon may be generated based on contextual factors that include attributes of media content presented within a GUI of the client device 102, according to certain example embodiments.

For example, as seen in the interface diagram 500, the media content 502 may include video content. Responsive to determining that the media content 502 includes video content, the contextual navigation menu system 124 may generate and cause display of the contextual icon 510 at a position within a menu element, wherein the contextual icon 510 comprises a display of a media control element, such as a play button.

In some embodiments, the media content may include the media content 504, wherein the media content 504 includes a display of one or more user identifiers 518. Responsive to detecting the one or more user identifiers 518 within the media content 504, the contextual navigation menu system 124 may generate and cause display of the contextual icon 512, wherein the contextual icon 512 is configured to receive a user input, and in response present a display of a list of user identifiers listed within the media content 504.

In some embodiments, as depicted by the media content 506, the media content may include a display of a query, or request, such as the query 520. Responsive to detecting the query 520 within the media content 506, the contextual navigation menu system 124 may generate and cause display of the contextual icon 514, wherein the contextual icon 514 comprises a display of one or more response options to the request, or similarly, may simply provide a field for a user to provide an input that includes a response to the request (i.e., a text input field).

In some embodiments, as depicted by the media content 508, the media content may include a link to a webpage. Responsive to detecting the link to the webpage within the media content 508, the contextual navigation menu system 124 may generate and cause display of the contextual icon 516, wherein the contextual icon 516 may include a display of a URL associated with the webpage, and may be configured to receive a user input, and responsive to the user input, causes a browser of the client device 102 to navigate to a webpage associated with the link depicted in the media content 508.

Software Architecture

Figure 6:
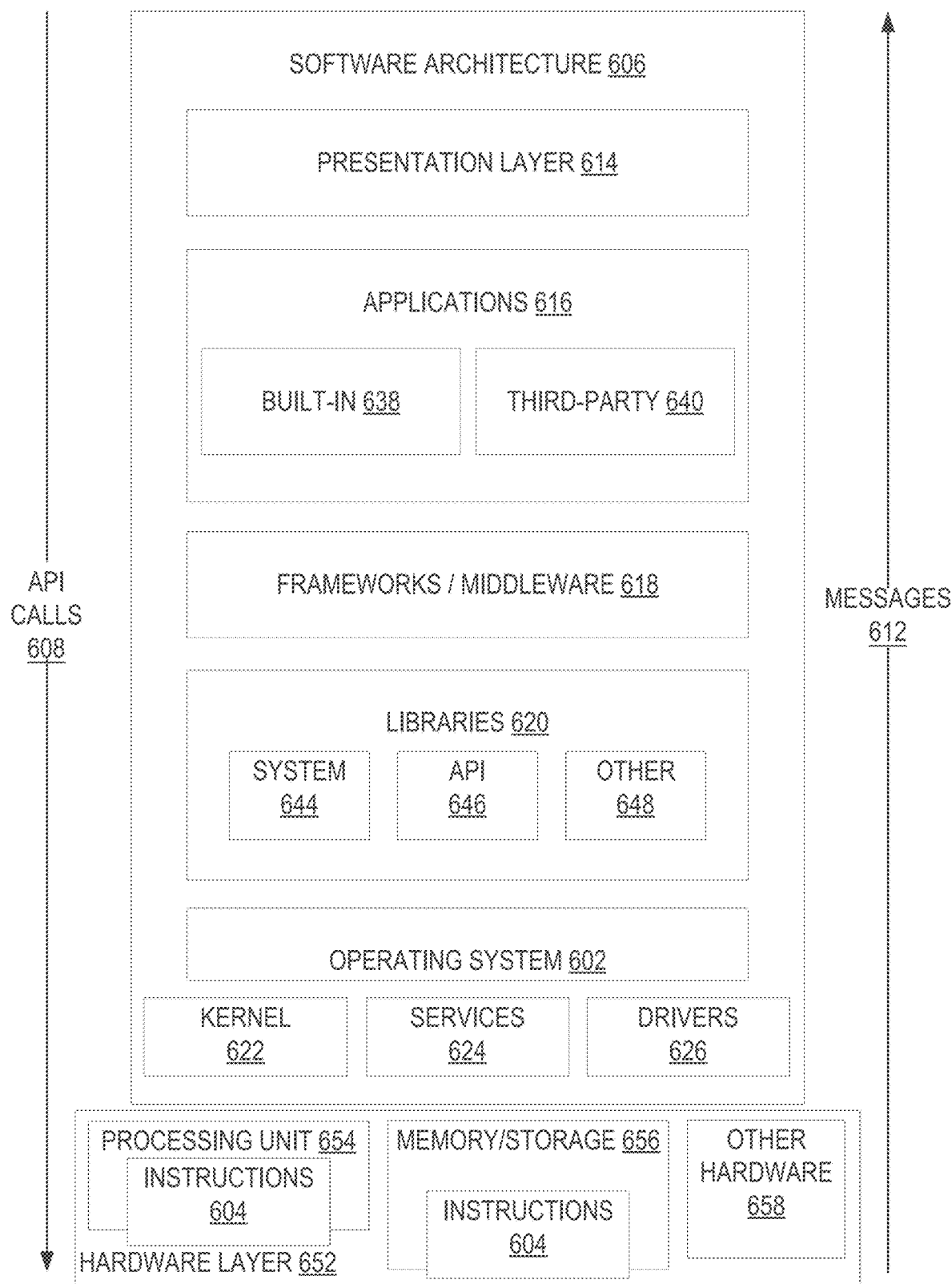
FIG. 6 is a block diagram illustrating a representative software architecture, which may be used in conjunction with various hardware architectures herein described and used to implement various embodiments.
Figure 7:
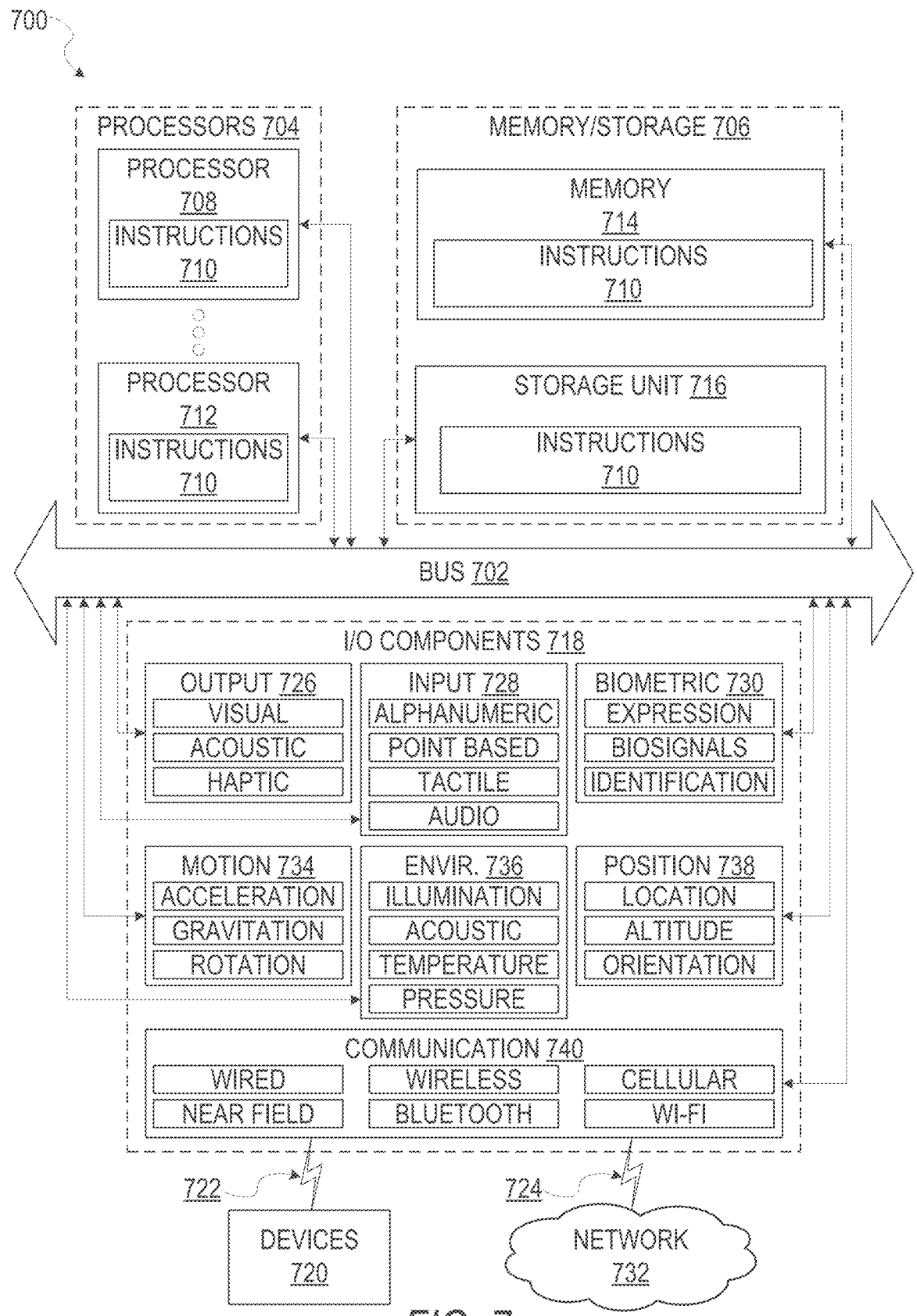
FIG. 7 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as the machine 800 of FIG. 8 that includes, among other things, processors 804, memory 814, and I/O components 818. A representative hardware layer 652 is illustrated and can represent, for example, the machine 600 of FIG. 6. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive a response as in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system, Alternatively, or additionally, in some systems interactions with a user may occur through a presentation layer, such as presentation layer 614. In these systems, the application/component "logic" can be separated from the aspects of the application/component that interact with a user.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental environment components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer gravitation sensor components, rotation sensor components (e.g., gyroscope), and so forth. The environment components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a Universal Serial Bus (USB)).

Moreover, the communication components 840 may detect identifiers or include components operable to detect identifiers. For example, the communication components 840 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (N/LAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   causing display of media content within a graphical user interface (GUI), the media content comprising a set of media attributes;
   detecting the set of media attributes of the media content;
   generating a menu element based on the set of media attributes of the media content; and
   causing display of the menu element at a position within the GUI.

2. The method of claim 1, wherein the media content comprises an ephemeral message.

3. The method of claim 1, further comprising:
   receiving an input that selects the menu element; and
   causing display of a secondary menu element that comprises a presentation of at least a portion of the set of media attributes of the media content.

4. The method of claim 1, wherein the menu element comprises a plurality of icons, and the generating the menu element further comprises:
   generating the plurality of icons based on the set of media attributes.

5. The method of claim 1, wherein the media content further comprises video content, and wherein the generating the menu element further comprises:
   presenting a media control element at within the menu element based on the video content.

6. The method of claim 1, wherein the position of the menu element is at a bottom portion of the GUI.

7. The method of claim 1, wherein the media content further comprises a query that comprises a request for a binary response, and wherein the generating the menu element further comprises:
   presenting a set of options within the menu element based on the query.

8. A system comprising:
   a memory; and
   at least one hardware processor coupled to the memory and comprising instructions that causes the system to perform operations comprising:
   causing display of media content within a graphical user interface (GUI), the media content comprising a set of media attributes;
   detecting the set of media attributes of the media content;
   generating a menu element based on the set of media attributes of the media content; and
   causing display of the menu element at a position within the GUI.

9. The system of claim 8, wherein the media content comprises an ephemeral message.

10. The system of claim 8, further comprising:
    receiving an input that selects the menu element; and
    causing display of a secondary menu element that comprises a presentation of at least a portion of the set of media attributes of the media content.

11. The system of claim 8, wherein the menu element comprises a plurality of icons, and the generating the menu element further comprises:
    generating the plurality of icons based on the set of media attributes.

12. The system of claim 8, wherein the media content further comprises video content, and wherein the generating the menu element further comprises:
    presenting a media control element at within the menu element based on the video content.

13. The system of claim 8, wherein the position of the menu element is at a bottom portion of the GUI.

14. The system of claim 8, wherein the media content further comprises a query that comprises a request for a binary response, and wherein the generating the menu element further comprises:
   presenting a set of options within the menu element based on the query.

15. A non-transitory machine-readable storage medium comprising instructions that, when executed by one or more processors of a machine, cause the machine to perform operations comprising:
   causing display of media content within a graphical user interface (GUI), the media content comprising a set of media attributes;
   detecting the set of media attributes of the media content;
   generating a menu element based on the set of media attributes of the media content; and
   causing display of the menu element at a position within the GUI.

16. The non-transitory machine-readable storage medium of claim 15, wherein the media content comprises an ephemeral message.

17. The non-transitory machine-readable storage medium of claim 15, further comprising:
   receiving an input that selects the menu element; and
   causing display of a secondary menu element that comprises a presentation of at least a portion of the set of media attributes of the media content.

18. The non-transitory machine-readable storage medium of claim 15, wherein the menu element comprises a plurality of icons, and the generating the menu element further comprises:
   generating the plurality of icons based on the set of media attributes.

19. The non-transitory machine-readable storage medium of claim 15, wherein the media content further comprises video content, and wherein the generating the menu element further comprises:
   presenting a media control element at within the menu element based on the video content.

20. The non-transitory machine-readable storage medium of claim 15, wherein the position of the menu element is at a bottom portion of the GUI.

\* \* \* \* \*